(12) United States Patent
Oncina et al.

(10) Patent No.: US 7,559,696 B2
(45) Date of Patent: Jul. 14, 2009

(54) ACTIVE THRUST MANAGEMENT SYSTEM

(75) Inventors: Carlos Oncina, Ellensburg, WA (US);
Michael E. Mehrer, San Diego, CA (US); Bing Tong, San Diego, CA (US); Pete Suttie, San Diego, CA (US); Daih-Yeou Chen, San Diego, CA (US); William Dornfield, San Diego, CA (US)

(73) Assignee: Hamilton Sundstrand Corporation, Rockford, IL (US)

( * ) Notice: Subject to any disclaimer, the term of this patent is extended or adjusted under 35 U.S.C. 154(b) by 429 days.

(21) Appl. No.: 10/929,803

(22) Filed: Aug. 30, 2004

(65) Prior Publication Data
US 2006/0045398 A1    Mar. 2, 2006

(51) Int. Cl.
*F16C 32/06* (2006.01)
(52) U.S. Cl. ...................... 384/100; 384/114
(58) Field of Classification Search ............... 384/121, 384/124, 123, 112, 107, 100, 114–120
See application file for complete search history.

(56) References Cited
U.S. PATENT DOCUMENTS

| | | | |
|---|---|---|---|
| 3,560,064 A * | 2/1971 | Silver ......................... 384/114 |
| 3,909,081 A * | 9/1975 | Wilcock et al. ............. 384/101 |
| 4,090,743 A * | 5/1978 | Suzuki et al. ............... 384/113 |
| 4,184,720 A | 1/1980 | Zacherl |
| 4,193,644 A * | 3/1980 | Miyashita et al. ........... 384/107 |
| 4,643,592 A * | 2/1987 | Lewis et al. ................. 384/100 |
| 4,989,997 A * | 2/1991 | Yoshimura .................. 384/100 |
| 5,013,165 A | 5/1991 | Newman |
| 5,356,225 A * | 10/1994 | Hanes et al. ................ 384/100 |
| 5,397,183 A * | 3/1995 | Lu et al. ..................... 384/100 |
| 6,142,672 A * | 11/2000 | Bently et al. ................ 384/118 |
| 2002/0081044 A1* | 6/2002 | Shima ........................ 384/100 |
| 2002/0097928 A1 | 7/2002 | Swinton et al. |

* cited by examiner

*Primary Examiner*—Thomas R Hannon
(74) *Attorney, Agent, or Firm*—Carlson, Gaskey & Olds, P.C.

(57) ABSTRACT

An active thrust management system varies pressure responsive to changes in rotor assembly thrust to maintain a desired position. The system includes a bearing supporting rotation of a rotor assembly within a pressurizing chamber. The rotor assembly is supported on a cushion of air generated between the bearing and the rotor assembly. Pressure within a cavity adjacent the rotor assembly opposes a thrust force to maintain a desired position of the rotor assembly. Modulating airflow into the pressurizing chamber adjacent the rotor assembly compensates for changes in the thrust generated by the rotor assembly to maintain the desired rotor assembly position.

19 Claims, 2 Drawing Sheets

ACTIVE THRUST MANAGEMENT SYSTEM

BACKGROUND OF THE INVENTION

This invention generally relates to a thrust bearing. More particularly, this invention relates to an active thrust bearing for a turbine engine.

Machinery such as generators and compressors that operate at relatively high speeds require low friction bearing assemblies that produce little heat. Hydraulic and air bearings are often utilized for such applications and provide the desired low friction. A conventional air bearing assembly includes a bearing element that contacts and supports a rotating member at rest. A cushion of air formed between the bearing element and the rotating member lifts the bearing elements off of the rotating member such that the rotating member is rotating and supported on the cushion of air. The cushion of air supporting the rotating element provides minimal friction, and therefore produces minimal heat.

Typically, the rotating member generates a thrust force that moves the rotating element from a desired position. Typically, the generator or compressor rotates at a fixed rotational speed such that the configuration of the air bearing can be designed to accommodate the thrust force and maintain the desired position of the rotating member. However, variations in thrust force that may result from operational mode changes or from changes in loading levels cannot be accommodated by the fixed configuration of the typical air bearing. Disadvantageously, such difficulties limit the use of air bearings to devices that operate at a fixed rotational speed and constant thrust force.

For this reason is it desirable to develop a low friction bearing system capable of adapting to variation in thrust forces generated by a rotating member.

SUMMARY OF THE INVENTION

This invention is an active bearing assembly for a turbine engine-producing variable thrust forces. The active bearing assembly varies a pressure responsive to changes in thrust that balances and maintains a desired position of a rotating member.

The bearing assembly includes a plurality of bearing assemblies supporting rotation of a rotor assembly. A portion of the rotor assembly along with the bearing assemblies are disposed within a pressurizing chamber. A film of air between the bearing assemblies and the rotor assembly support rotation. Pressure within the chamber adjacent the rotor assembly opposes a thrust force generated by rotation of the rotor assembly. A fixed orifice generates a known flow rate out of the chamber. An airflow valve regulates airflow into the chamber to produce a desired pressure to counterbalance the thrust force exerted by the rotor assembly.

Sensors disposed on either side of the rotor assembly provide position information that is utilized by a controller to adjust air pressure within the chamber to balance against the thrust force from the rotor assembly. Continuous adjustment of pressure within the chamber provides for countering of changing thrust force levels produced by the rotor assembly. Further, the controller actuates the airflow valve in anticipation of known thrust levels. Pressure within the chamber and adjacent the rotor assembly is raised to the anticipated level followed by fine adjustments made in view of position feedback from the sensors.

The active bearing assembly of this invention accommodates variable thrust by modulating pressure within a chamber in response to anticipated thrust levels and positional feedback information.

These and other features of the present invention can be best understood from the following specification and drawings, the following of which is a brief description.

DETAILED DESCRIPTION OF THE PREFERRED EMBODIMENT

Figure 1:
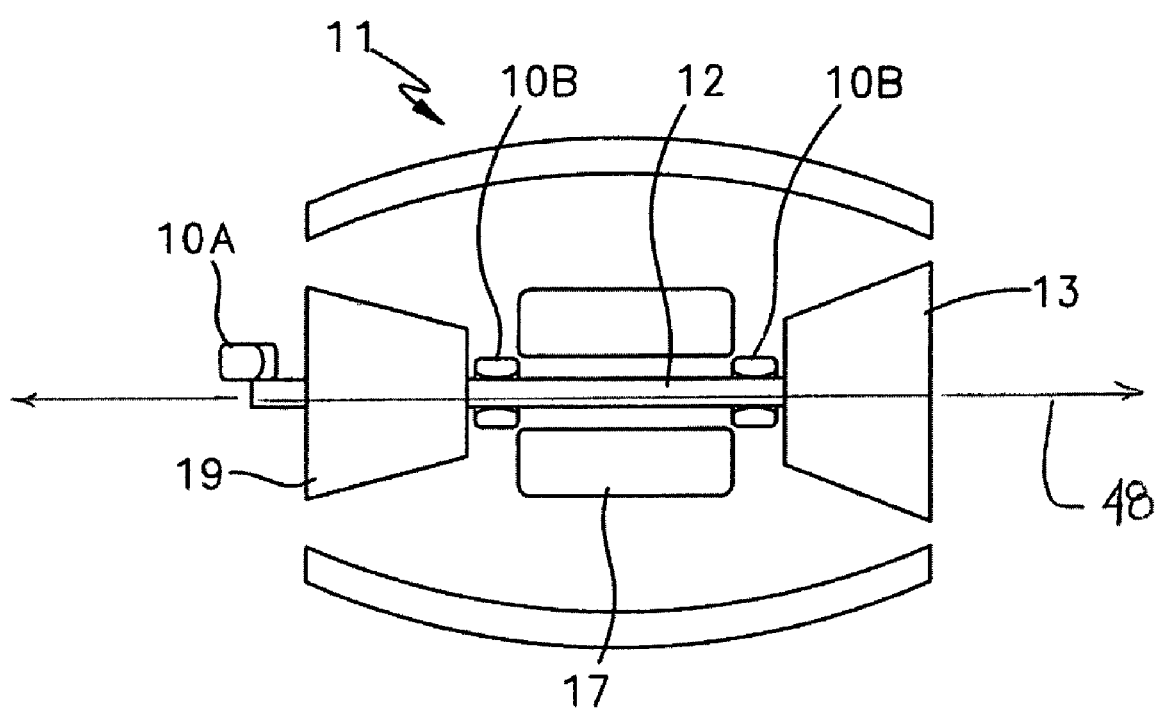
FIG. 1 is a schematic view of a turbine engine with an example bearing assembly according to this invention.

Referring to FIG. 1, a gas turbine engine assembly 11 is schematically illustrated and includes a compressor 19 providing compressed air to a combustor 17. Fuel mixes with compressed air within the combustor 17 and generates hot gases traveling at a high speed. The hot gases discharged from the combustor 17 drive a turbine 13. A rotor assembly 12 supported both axially and radially by air bearing assemblies 10A, 10B driven by the turbine 13 drives the compressor 19. The axial bearing 10A maintains a desired axial position of the rotor assembly. The radial bearing 10B maintains a desired radial position of the rotor assembly 12. The operation of a gas turbine engine assembly 11 is well known, and the description of components and operation is by way of example only. Further, a worker versed in the art with the benefit of this disclosure will understand that other applications for the example bearing assemblies 10A, 10B are within the contemplation of this invention. The bearing arrangement shown is for example only. The bearing position and number of bearings is determined by requirements of the specific application.

Figure 2:
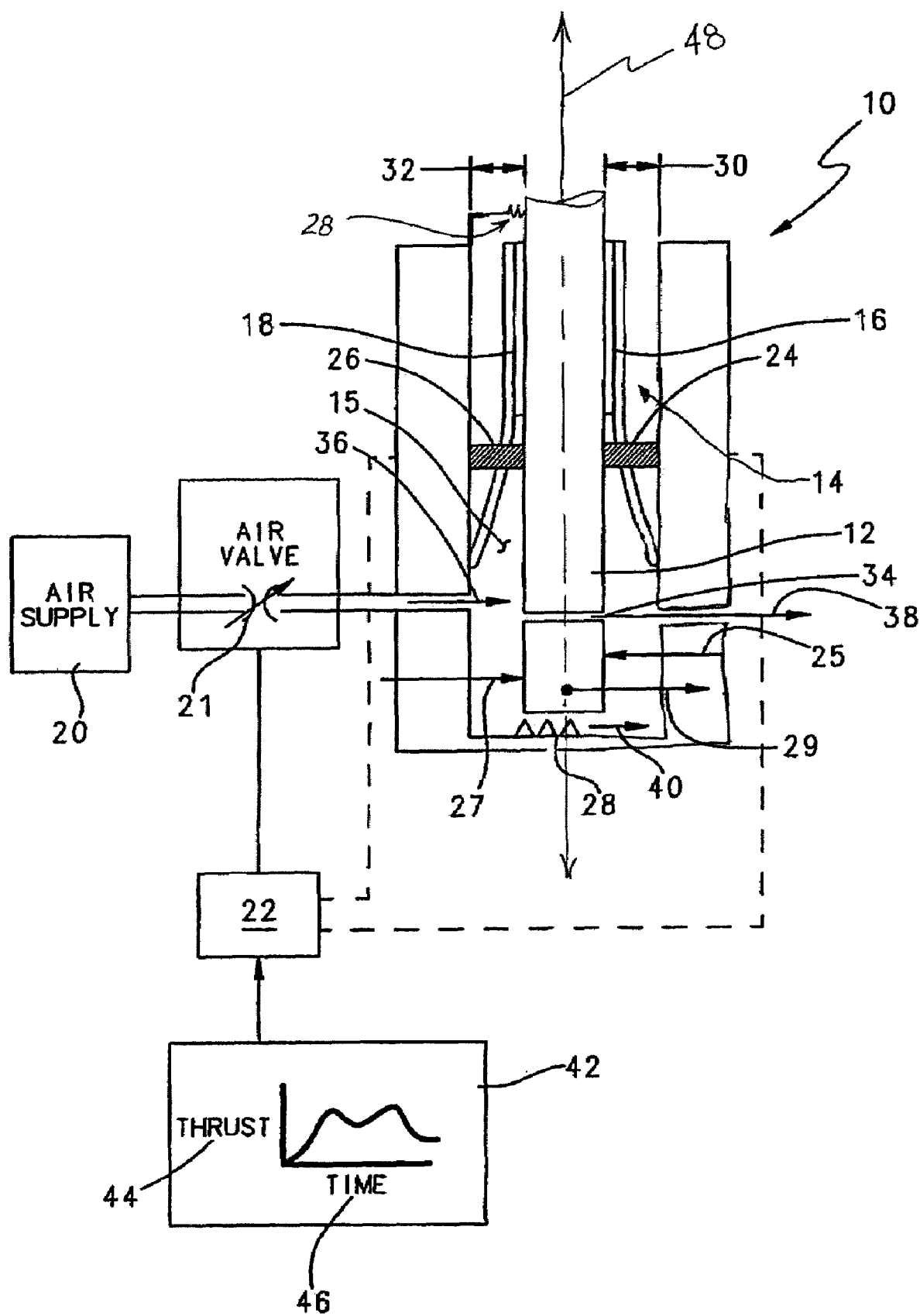
FIG. 2 is a schematic view of an example thrust bearing assembly.

Referring to FIG. 2, a schematic view of the example air bearing assembly 10 is shown and includes the rotor assembly 12 supported for rotation within a chamber 14. A first bearing 16 and a second bearing 18 are disposed within the chamber 14 to support rotation of the rotor assembly 12. The first and second bearings 16, 18 are shown schematically. The bearings 16, 18 are mounted within the chamber 14. Further, although an air bearing assembly 10A is shown in the exemplary embodiment, a worker with the benefit of this disclosure would understand the application to other bearing assemblies.

The chamber 14 and first and second bearings 16, 18 are supplied with pressurized air from an air supply 20. Seals 28 seal against the rotor assembly 12 to prevent air from escaping around the rotor assembly 12. A small leakage airflow 40 escapes through the seals 28 at a known rate. The air supply 20 is preferably a regulated air supply to an air valve 21. Further, use of alternate sources of air pressure such as engine compressor bleed air, are known and within the contemplation of this invention.

The air valve 21 regulates air from the air supply 20 and is commanded by a controller 22 to produce a desired airflow 36 to the pressurizing chamber 15. A first sensor 24 and a second sensor 26 communicate with the controller 22 to provide information on the position of the rotor assembly 12. The example first and second sensors 24, 26 measure a distance between the rotor assembly 12 and a side of the chamber 14. If the distances are equal than the rotor assembly 12 is in the desired position. A difference between measurement distances indicates a movement from the desired center position.

At rest, the rotor assembly 12 is in contact with the first and second bearings 16, 18. As the rotor assembly 12 begins to rotate a cushion of air builds along the surface of the rotor assembly 12 and between the bearing assemblies 16, 18. The bearing assemblies 16, 18 lift off the rotor assembly 12 such that the rotor assembly 12 rotates on a cushion of air without contacting the bearing assemblies 16, 18.

Rotation of the rotor assembly 12 generates a thrust force 25 that drives the rotor assembly 12 away from a centered position within the chamber 14. The chamber 14 includes a pressurizing chamber 15 adjacent one side of the rotor assembly 12. Pressure within the pressurizing chamber 15 exerts a counter force 27 on the rotor assembly 12 opposing the force 25 produced by the rotor assembly 12. The combination of the force 25 and the counter force 27 produce a resultant force 29 that provides the desired balance and position of the rotor assembly 12.

The rotor assembly 12 includes an orifice 34 in communication with the pressurizing chamber 15. The orifice 34 is of a known size that produces a known flow for a given pressure. Air pressure within the pressurizing chamber 15 is maintained by balancing incoming airflow 36 against outgoing airflow 38. The outgoing airflow 38 is exhausted from the pressurizing chamber 15 through the orifice 34, and seals 28. The size of the orifice 34 is determined according to application specific parameters. With a known size of the orifice 34 and known leakage 40, the controller 22 can provide the volume of incoming airflow 36 required to provide the desired pressure within the pressurizing chamber 15 at any given time.

In operation, the rotor assembly 12 begins rotating such that the bearings 16, 18 lift off of the rotor assembly 12. Airflow 36 is regulated to provide a desired pressure within the pressurizing chamber 15 that maintains a desired position of the rotor assembly 12. The pressure within the pressurizing chamber 15 is maintained by balancing incoming airflow 36 with outgoing airflow through the orifice 34 and leakage 40. Greater incoming airflow 36 relative to outgoing airflow 38 and leakage 40, produces an increase in pressure within the pressurizing chamber 15. Reducing incoming air flow 36 relative to outgoing airflow 38 and leakage 40 reduces pressure within the pressurizing chamber 15. The pressure within the pressurizing chamber 15 produces the desired counter force 27.

The rotor assembly 12 rotates at various speeds depending on the specific operating conditions. Variation of rotor assembly speed causes a variation in the force 25 exerted by the rotor assembly 12 in a direction perpendicular to axial rotation. Increases in force 25 moves the rotor assembly 12 toward the bearing 18. Decreases in force 25 without a corresponding decrease in counter force 27 produced within the pressurizing chamber 15 will result in movement of the rotor assembly 12 toward the bearing 16. The controller 22 modulates the air valve 21 responding to measured movement of the rotor assembly 12 to adjust pressure with the pressurized chamber 15 and thereby the counter force 27 that maintains a desired position of the rotor assembly 12.

The first and second sensors 24, 26 communicate the position of the rotor assembly 12 to the controller 22. The controller 22 utilizes the position information communicated from the sensors 22 to determine what pressure is required and if an increase or decrease in pressure within the pressurizing chamber 15 are required. The air valve 21 is modulated to produce the airflow 36 that results in the desired pressure within the pressurizing chamber 15. A reduction in pressure in the pressurizing chamber 15 will result in movement of the rotor assembly 12 toward the bearing 18, and an increase in pressure will result in movement toward the bearing 16. The airflow 36 stabilizes as the rotor assembly 12 reaches the desired centered position.

The example controller 22 uses a proportional plus integral plus differential control to determine the command signal to modulate the air valve 21. The controller 22 is as known, and a worker versed in the art would understand how to program a commercially available microprocessor to provide the desired commands for the air valve 21.

The rotor assembly 12 generates a known force 25 during known operating parameters; such as for example during start up. A schedule of thrust dynamics 42 is utilized by the controller 22 to anticipate the magnitude of the force 25 for a known time. The schedule of thrust dynamics 42 correlates an operation time or sequence with a know magnitude of the force 25. In the example schedule of thrust dynamics 42, a thrust force 44 is provided relative to a time 46. The controller 22 utilizes this known relationship for modulating the air valve 21 to provide pressure within the pressurizing chamber 15 that will produce the required counter force 29 that maintains the desired position of the rotor assembly 12.

The example schedule of thrust dynamics 42 relate thrust 44 to time 46, however, other relationships affecting force 25, such as turbine engine load can be utilized to form a relationship providing for anticipation of the force 25. The anticipated counter force provided from the schedule of thrust dynamics 42 provides an initial setpoint and the sensors 26, 24 provide positional feed back to the controller 22, such that the controller 22 can make further adjustments to airflow 36 required to maintain the rotor assembly 12 in the desired position.

The example active bearing assembly 10 counters variable thrust forces to enable use of air bearing assemblies in variable thrust machines such as the example turbine engine assembly 11.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An active air bearing assembly comprising:
   a rotatable element producing a force in a direction away from a desired position;
   a bearing supporting rotation of said rotatable element;
   a chamber adjacent said rotatable element, wherein said bearing is disposed within said chamber for supporting the rotatable element; and
   a valve controlling pressure within said chamber for countering said force in a direction away from a desired position produced by said rotatable element.

2. The assembly as recited in claim 1, wherein said valve controls flow into said chamber.

3. The assembly as recited in claim 1, including an orifice through said rotatable element.

4. The assembly as recited in claim 3, wherein said orifice includes a fixed opening for producing a desired pressure differential.

5. The assembly as recited in claim 1, including a controller for modulating said valve.

6. The assembly as recited in claim 5, including a sensor for measuring a position of said rotatable element, said sensor communicating said position to said controller.

7. The assembly as recited in claim 5, wherein said controller adjusts said valve to provide a desired flow into said chamber that produces a desired pressure within said chamber.

8. The assembly as recited in claim 7, wherein said desired pressure within said chamber counters said force in a direction away from a desired position generated by said rotatable element.

9. The assembly as recited in claim 1, wherein said bearing supporting rotation of said rotatable element comprises at least a first and a second bearing assembly.

10. The assembly as recited in claim 9, wherein a fluid pressure is generated between the at least a first and second bearing assemblies and said first and second bearing assemblies lift off the rotating element responsive to a desired pressure within said chamber.

11. The assembly as recited in claim 1, wherein the rotatable element comprises a rotor assembly for a gas turbine engine.

12. A method of controlling a position of a rotatable element supported for rotation within an air bearing, said method comprising the steps of:
   a. supporting the rotatable element on at least one bearing in a non-rotating condition;
   b. lifting the at least one bearing from the rotatable element responsive to rotation of the rotatable element and obtaining a desired air pressure between the at least one bearing and the rotatable element;
   c. measuring a position of the rotatable element; and
   d. adjusting airflow adjacent the rotatable element to produce a counter force opposing a generated force in a direction away from a desired position of the rotatable element generated by the rotatable element.

13. The method as recited in claim 12, wherein said step b. includes adjusting airflow responsive to a difference between said measured position and a desired position.

14. The method as recited in claim 12, wherein said step b. includes adjusting airflow to provide a force opposing an anticipated generated force.

15. The method as recited in claim 12, wherein said step b. includes adjusting airflow to produce a counter force responsive to changes in the thrust force generated by the rotatable element.

16. The method as recited in claim 15, wherein said step a. includes a sensor measuring a position of the rotatable element and communicating the measured position to a controller and an air valve for adjusting the airflow commanded by the controller.

17. The assembly as recited in claim 12, wherein the rotatable element comprises a rotor assembly for a gas turbine engine, wherein said adjusting step further comprises anticipating a magnitude of force generated in a direction transverse to rotation of the rotor assembly for an operating sequence and modulating airflow to maintain a desired position of the rotor assembly.

18. The assembly as recited in claim 17, wherein the operating sequence comprises a load on the gas turbine engine.

19. The assembly as recited in claim 17, including anticipating a force generated to provide an initial airflow to provide a desired position of the rotor assembly and providing additional adjustment of the airflow responsive to a measured position of the rotatable element.

* * * * *

UNITED STATES PATENT AND TRADEMARK OFFICE
CERTIFICATE OF CORRECTION

| | |
|---|---|
| PATENT NO. | : 7,559,696 B2 |
| APPLICATION NO. | : 10/929803 |
| DATED | : July 14, 2009 |
| INVENTOR(S) | : Oncina et al. |

It is certified that error appears in the above-identified patent and that said Letters Patent is hereby corrected as shown below:

CLAIMS

Claim 14, Column 6, Line 7, insert --counter-- before "force".

Claim 15, Column 6, Line 11, replace "thrust" with --generated--.

Signed and Sealed this

Twentieth Day of October, 2009

David J. Kappos
*Director of the United States Patent and Trademark Office*